US008819174B2

(12) United States Patent
Yanagisawa

(10) Patent No.: US 8,819,174 B2
(45) Date of Patent: Aug. 26, 2014

(54) INFORMATION PROCESSING SYSTEM, INFORMATION PROCESSING METHOD, AND STORAGE MEDIUM

(75) Inventor: Mitsuru Yanagisawa, Tokyo (JP)

(73) Assignee: NEC Corporation, Tokyo (JP)

( * ) Notice: Subject to any disclaimer, the term of this patent is extended or adjusted under 35 U.S.C. 154(b) by 128 days.

(21) Appl. No.: 13/384,080

(22) PCT Filed: Jan. 20, 2010

(86) PCT No.: PCT/JP2010/000284
§ 371 (c)(1),
(2), (4) Date: Jan. 13, 2012

(87) PCT Pub. No.: WO2011/007463
PCT Pub. Date: Jan. 20, 2011

(65) Prior Publication Data
US 2012/0124166 A1 May 17, 2012

(30) Foreign Application Priority Data

Jul. 17, 2009 (JP) .................................. 2009-168497

(51) Int. Cl.
*G06F 15/16* (2006.01)
(52) U.S. Cl.
USPC ........................... 709/217; 709/203; 714/738
(58) Field of Classification Search
CPC ........................ H04L 67/1002; G06F 11/3688
USPC ............... 709/217, 218, 203; 717/166; 718/1, 718/105; 714/738
See application file for complete search history.

(56) References Cited

U.S. PATENT DOCUMENTS

2007/0245331 A1* 10/2007 Daynes et al. ................ 717/166
2007/0283009 A1* 12/2007 Takemura ..................... 709/224
2009/0133018 A1*  5/2009 Kaneki ............................ 718/1
2009/0144393 A1*  6/2009 Kudo ............................ 709/218

FOREIGN PATENT DOCUMENTS

| JP | 2006-31178  | A | 2/2006  |
| JP | 2007-323245 | A | 12/2007 |
| JP | 2008-146313 | A | 6/2008  |
| JP | 2009-134687 | A | 6/2009  |

OTHER PUBLICATIONS

International Search Report of PCT/2010/000284 dated Mar. 16, 2010.

* cited by examiner

*Primary Examiner* — Frantz Jean
(74) *Attorney, Agent, or Firm* — Sughrue Mion, PLLC

(57) ABSTRACT

Provided is an information processing system that reflects a processing load of the virtual machine actually running in one server, and reproduces the processing load generated in the case where this virtual machine is run in the other server. An information processing system (1000) includes a server A(100) and a server B(200) that can communicate with each other through a network (500). The server A(100) runs a virtual machine (123), and transmits, to the server B(200), load information indicative of a processing load generated in the server A(100) as a result of running the virtual machine (123) when the virtual machine (123) is run. The server B(200) generates the processing load on the basis of the load information received from the server A(100).

17 Claims, 10 Drawing Sheets

INFORMATION PROCESSING SYSTEM, INFORMATION PROCESSING METHOD, AND STORAGE MEDIUM

CROSS REFERENCE TO RELATED APPLICATIONS

This application is a National Stage of International Application No. PCT/JP2010/000284 filed Jan. 20, 2010, claiming priority based on Japanese Patent Application No. 2009-168497 filed Jul. 17, 2009, the contents of all of which are incorporated herein by reference in their entirety.

TECHNICAL FIELD

The present invention relates to an information processing system, an information processing method, and a storage medium. In particular, the present invention relates to an information processing system, an information processing method, and a storage medium capable of estimating a load of a virtual machine running in one server, and reproducing the load of this server in the other server in parallel with the estimation.

BACKGROUND ART

In recent years, server integration utilizing a virtualizing technique has been widely spreading. However, in the case where a virtual machine is transferred (migration) between servers having different performances in order to perform maintenance, for example, due to a high load or trouble after the server integration, it is difficult to accurately estimate the load of the virtual machine after the transferring because of difference in virtualization types, or difference in hardware performances between servers. As a method for solving this problem, various methods have been devised, in which the destination server simulates the load of the virtual machine to know the performances in advance.

As such a technique, Patent Document 1 (Japanese Patent Application Laid-open No. 2008-146313) discloses the following technique. Here, a description will be made with reference to FIG. 1 of Patent Document 1. An active server 10 is a computer that performs an actual job operation. A standby server 20 is a computer that takes over the actual job operation from the active server 10 in the case where any trouble occurs in the active server 10. A newly installed server 30 is a computer that is to be newly installed. A management terminal 40 is a computer used by a manager who evaluates performances of the newly installed server 30. A communication network 50 is, for example, the Internet or a local area network (LAN).

The management terminal 40 receives an input of a benchmark program that provides an input data generating function of generating input data and a CPU load generating function of using a CPU of the computer in accordance with the input data. Then, the standby server 20 and the newly installed server 30 are caused to run the benchmark program. The standby server 20 measures a processing load of the standby server 20 itself caused as a result of running the benchmark program. The newly installed server 30 measures a processing load of the newly installed server 30 itself caused as a result of running the benchmark program. The management terminal 40 outputs the processing loads of the standby server 20 and the processing load of the newly installed server 30, thereby to realize a load simulation, by which the performance evaluation of the computer can be easily performed.

With the configuration described above, of application programs for the actual job operation running in the active server 10, an application program (benchmark program) simulating an operation of an application having a higher processing load is installed in the newly installed server 30, and, a processing load (amount of resource consumption) of the newly installed server 30 is measured at the time when the newly installed server 30 causes the benchmark program to process the input data same as that processed in the active server 10. This enables the newly installed server 30 to reproduce a processing load equivalent to the processing load of the application program for the actual job operation.

Further, Patent Document 1 discloses that similar processing is possible in the case of a virtual machine in lieu of the application program.

RELATED DOCUMENT

Patent Document

Patent Document 1: Japanese Patent Application Laid-open No. 2008-146313

SUMMARY OF THE INVENTION

However, in the case where Patent Document 1 is applied to the virtual machine, there was a problem concerning reproducibility of the processing load. More specifically, as compared with the application program, the virtual machine operates with more complicated factors. Therefore, even if input data is generated in advance under a certain condition and a processing load is reproduced on the basis of the input data, the virtual machine is less likely to be performed under the completely same condition, and hence, the consistency with the actual processing load cannot be maintained.

The present invention has been made in view of the circumstances described above, and an object of the present invention is to provide an information processing system, an information processing method, and a storage medium, which reflect a processing load of a virtual machine actually running in one server to reproduce a processing load generated in the case where the virtual machine runs in the other server.

According to the present invention, there is provided an information processing system including a first server and a second server that can communicate with each other through a network, the first server including: a running unit that runs a virtual machine; and, a load-information transmitting unit that transmits, to the second server, load information indicative of a processing load generated in the first server as a result of running the virtual machine when the running unit runs the virtual machine, and, the second server including: a load generating unit that generates a processing load on the basis of the load information received from the first server.

Further, according to the present invention, there is provided an information processing method including: running a virtual machine in a first server; transmitting, to a second server through a network, load information indicative of a processing load generated in the first server as a result of running the virtual machine when the virtual machine is run; and, generating a processing load on the basis of the load information received from the first server.

Yet further, according to the present invention, there is provided a storage medium that stores programs executed by a first server and a second server that can communicate with each other through a network, the program causing the first server or the second server to perform: a running process of causing the first server to run a virtual machine; a load-information transmitting process of transmitting, to the second server, load information indicative of a processing load generated in the first server as a result of running the virtual machine when the virtual machine is run in the running process; and, a load generating process of generating a processing load in the second server on the basis of the load information received from the first server.

According to the present invention, there are provided an information processing system, an information processing method, and a storage medium, which reflect a processing load of a virtual machine actually running in one server, thereby to reproduce a processing load generated in the case where the virtual machine is run in the other server.

BRIEF DESCRIPTION OF THE DRAWINGS

The above-described object, other objects, features and advantages will be made further clear by the preferred exemplary embodiment described below and the following attached drawings.

DESCRIPTION OF EMBODIMENTS

Figure 1:
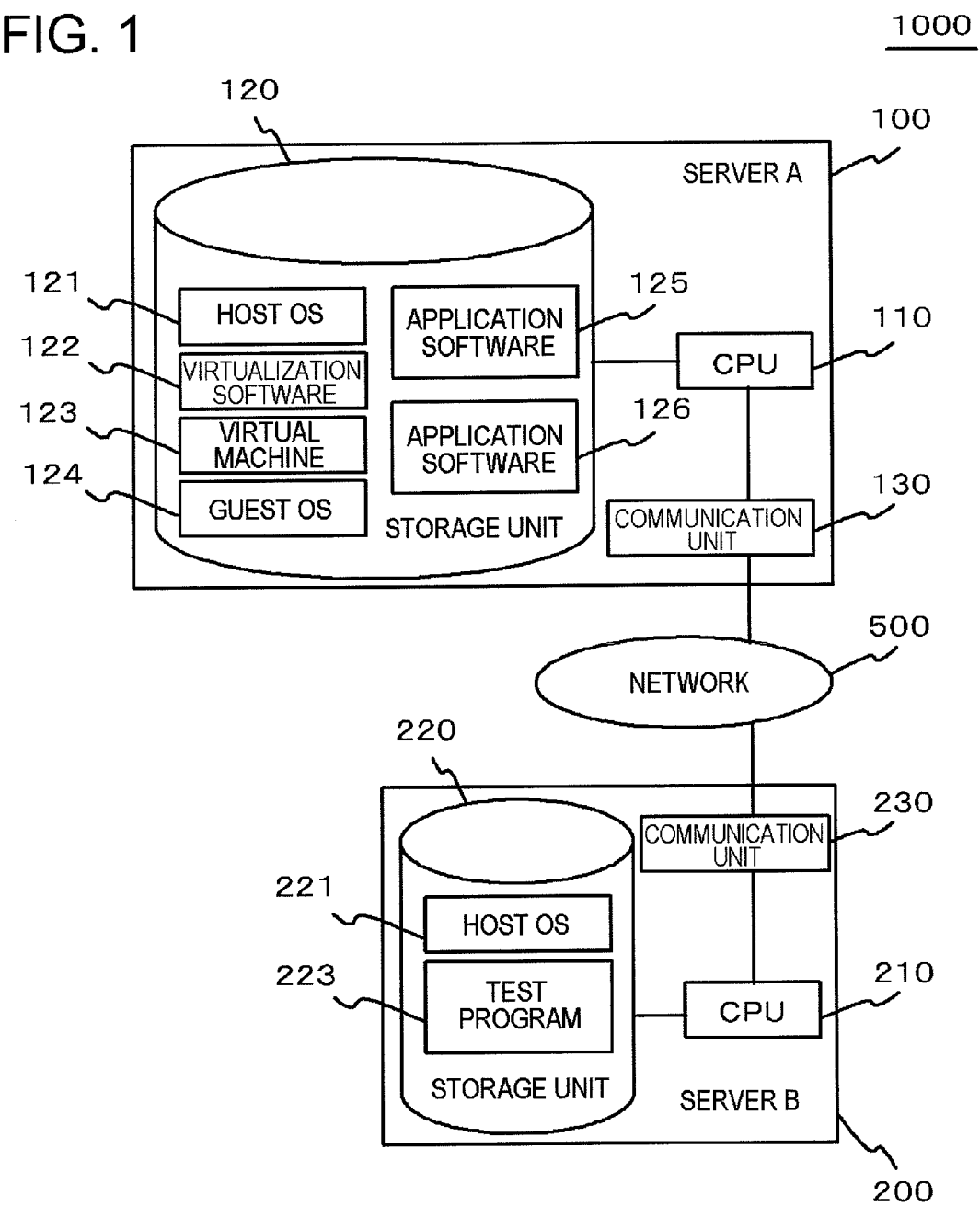
FIG. 1 is a configuration diagram of an information processing system according to a first exemplary embodiment.

Hereinbelow, an exemplary embodiment of the present invention will be described with reference to the drawings. Note that, in all the drawings, the same constituent components are denoted with the same reference numerals, and detailed explanation thereof will not be repeated.

[First Exemplary Embodiment]

FIG. 1 is a configuration diagram of an information processing system 1000 according to a first exemplary embodiment. The information processing system 1000 according to this exemplary embodiment includes a server A 100 and a server B200, which are communicable with each other through a network 500. The server A100 and the server B 200 each have a CPU 110, 210, and a storage unit 120, 220. The CPU 110 can read out and process a program, data and the like stored in the storage unit 120, and write the processed program, data and the like to the storage unit 120. Similarly, the CPU 210 can read out and process a program, data and the like stored in the storage unit 220, and write the processed program, data and the like to the storage unit 220.

The server A100 and the server B200 have communication units 130 and 230, respectively. The communication unit 130 can transmit the program, data and the like processed by the CPU 110 through the network 500 to the other device such as the server B200, and receive a program, data and the like through the network 500 from the other device. Similarly, the communication unit 230 can transmit the program, data and the like processed by the CPU 210 through the network 500 to the other device such as the server A100, and receive a program, data and the like through the network 500 from the other device.

The storage unit 120 of the server A100 stores, for example: a host OS 121, which is an operation system installed in the server A100; a virtual machine 123, which is software to create virtual hardware; virtualization software 122 that provides an environment where the virtual machine 123 can be run on the host OS 121; and, a guest OS 124, which is an operation system installed in the virtual machine 123. In this exemplary embodiment, the CPU 110 access the storage unit 120 to run the host OS 121, the virtualization software 122, and the virtual machine 123, whereby it is possible to realize the virtual hardware (virtual machine 123) on the server A100. In other words, in this exemplary embodiment, the CPU 110, the host OS 121 and the virtualization software 122 function as a running unit in the present invention.

The storage unit 120 further stores application software 126 that runs on the guest OS 124, and application software 125 that runs on the host OS 121.

Figure 2:
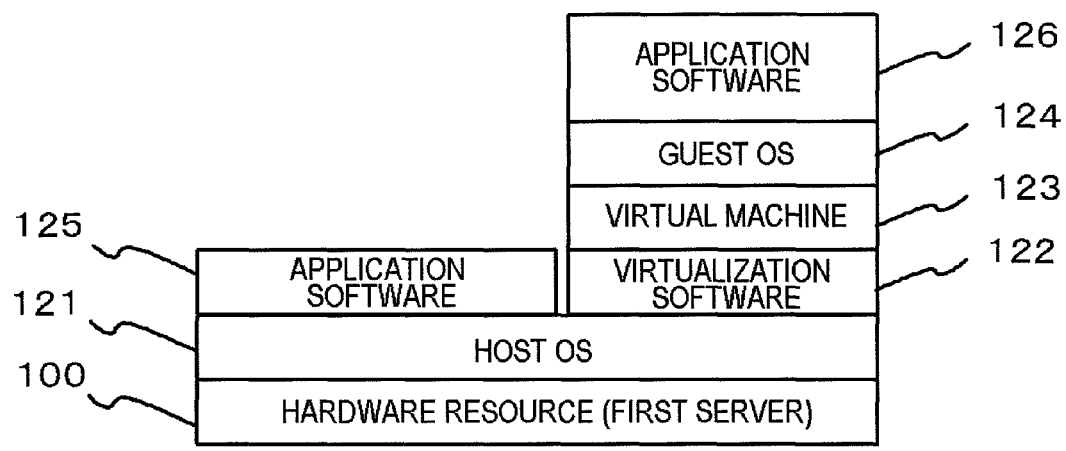
FIG. 2 is a diagram illustrating architecture of a server included in the information processing system according to the first exemplary embodiment.

FIG. 2 is a diagram illustrating architecture of the server A100. A hardware resource provided by the server A 100 is located at the lowest layer, and the host OS 121 is located on the hardware resource. On the host OS 121, the application software 125 and the virtualization software 122 are run. The server A100 runs the virtual machine 123 on the virtualization software 122, and runs the guest OS 124 on the virtual machine 123. Further, the application software 126 runs on the guest OS 124.

As illustrated in FIG. 2, the server A100 can run the application software 125 and the application software 126 on different layers in the architecture. However, in reality, the CPU provided to the server A100 runs the application software 125 and the application software 126 stored in the storage unit 120.

Next, a description will be made again with reference to FIG. 1. When the virtual machine 123 is run by the CPU 110, the server A100 can transmit, to the server B200, load information indicative of a processing load occurring in the server A100 occurring as a result of running the virtual machine 123.

More specifically, when activated by the CPU 110, the virtual machine 123 processes a utilization rate of a resource which is collected by a resource management function of the host OS 121, as load information, and transmits the load information through the communication unit 130 to the server B200. In other words, in this exemplary embodiment, the CPU 110, the communication unit 130, the virtual machine 123 and the host OS 121 function as a load-information transmitting unit in the present invention. The utilization rate of the resource as used herein means, for example, a utilization rate $R_n$ of the CPU 110 (a processing load of the CPU 110 occurring as a result of running the virtual machine 123 at a certain point in time/a maximum allowable processing load of the CPU 110), where the character n is a positive integer.

It should be noted that, in this exemplary embodiment, the processing load in the server A100 occurring as a result of running the virtual machine 123 includes a processing load occurring as a result of running the guest OS 124 and the application software 126 in a layer above the virtual machine 123, in addition to the processing load occurring as a result of running the virtual machine 123.

The storage unit 220 of the server B200 stores the host OS 221, which is an operation system installed in the server B200. Further, the storage unit 220 stores a test program 223 that generates a processing load based on the load information received from the server A100. The test program 223 is run on the host OS 221.

More specifically, once the communication unit 230 receives the load information from the server A100, the load information is processed by the CPU 210, and is stored in the storage unit 220.

The CPU 210 reads out and runs the test program 223 stored in the storage unit 220. Once activated, the test program 223 first collects data indicative of the maximum amount of resource of the server B200. The term "data indicative of the maximum amount of resources" as used herein refers, for example, to the maximum allowable processing load M of the. CPU 210. In this exemplary embodiment, the data are managed by the host OS 221.

The test program 223 calculates a target resource amount using the following Expression (1) on the basis of the received load information and the collected data. Note that $V_n$ in the Expression (1) is a predicted value of the processing load occurring in the server B200 at the time when the server B200 runs the virtual machine 123, serving as a target value of a processing load that the test program 223 applies to the CPU 210.

[Expression 1]

$$V_n = R_n \times M \tag{1}$$

The test program 223 generates a processing load until the processing load of the CPU managed by the host OS 221 reaches the calculated target value $V_n$. More specifically, using a numerical computation program, time required for computation and idle time is made fall within a certain period of time, whereby it is possible to output the utilization rate of the CPU in a constant manner. The processing load of the CPU can be made higher by increasing the number of computations, whereas the processing load of the CPU can be made lower by decreasing the number of computations.

With the method explained above, the test program 223 can generate the processing load expected to occur in the server B200 at the time when the server B200 runs the virtual machine 123. In other words, in this exemplary embodiment, the CPU 210, the host OS 221 and the test program 223 function as a load generating unit in the present invention.

It should be noted that the server A100 transmits the load information at a given point in time when the virtual machine 123 is running.

Further, the server A100 transmits the load information to the server B200 in an intermittent manner. The server B200 (CPU 210) runs the test program 223, and, every time when receiving the load information from the server A100, the test program 223 increases or decreases the generated processing load in accordance with the received load information. In this exemplary embodiment, the intermittent manner means that transmission is performed at certain time intervals T1. However, the transmission is not limited to this, and may be performed on a random basis.

More specifically, by applying the newly received utilization rate $R_n$ of the CPU 110 and the maximum allowable processing load M of the CPU 210 to the expression (1), the test program 223 calculates the target value $V_n$ for a new processing load, and generates a processing load corresponding to the calculated target value in the CPU 210.

As explained above, in the information processing system 1000 according to this exemplary embodiment, the running unit, the load-information transmitting unit, and the load generating unit are realized by running software with the CPU 110 or CPU 210.

More specifically, the information processing system 1000 is realized by programs that cause the server A100 (CPU 110) or the server B200 (CPU 210) to perform: a running process of causing the server A100 to run the virtual machine 123; a load-information transmitting process of transmitting, to the server B200, load information indicative of the processing load of the server A100 occurring as a result of running the virtual machine 123 at the time when the virtual machine 123 is run in the running process; and, a load generating process of generating a processing load in the server B200 on the basis of the load information received from the server A100.

Figure 3:
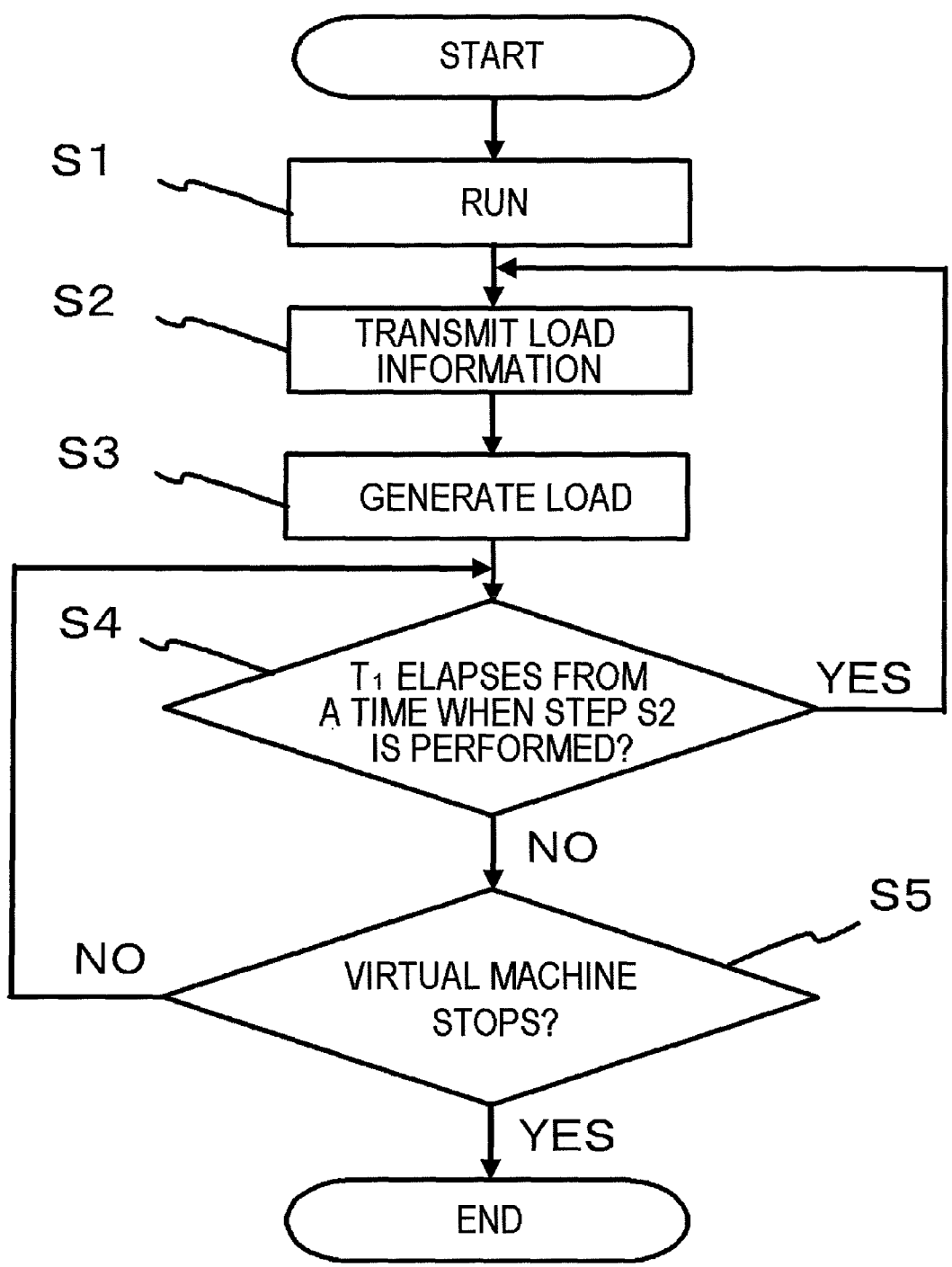
FIG. 3 is a flowchart illustrating an information processing method applied to the information processing system according to the first exemplary embodiment.

FIG. 3 is a flowchart illustrating an information processing method applied to the information processing system 1000 according to this exemplary embodiment. The information processing method includes a running step (step S1) in which the server A100 runs the virtual machine 123. The information processing method includes a load-information transmitting step (step S2) of transmitting, through the network 500 to the server B200, load information indicative of a processing load of the server A100 occurring as a result of running the virtual machine 123 at the time when the virtual machine 123 is run in the running step (step S1). Further, this information processing method includes a load generating step (step S3) of generating a processing load based on the load information that the server B200 receives from the server A100.

The server B200 keeps generating the processing load generated in the load generating step (step S3) until the time $T_1$ elapses after the load-information transmitting step (step S2) is performed (NO in step S4).

After the time $T_1$ elapses from the time when the load information transmitting step (step S2) is performed (YES in step S4), the server A100 performs the load information transmitting step (step S2) again. Then, every time the server B200 receives the load information transmitted in the load-information transmitting step (step S2), a new processing load is estimated in accordance with the received load information, and increases or decreases the generated processing load in the load generating step (step S3).

This information processing method is repeatedly performed during the time when the virtual machine run in the running step (step S1) is running (NO in step S5). However, upon stopping of the virtual machine (YES in step S5), this information processing method ends.

Next, effects obtained by this exemplary embodiment will be described. The server A100 runs the virtual machine 123; information indicative of a processing load thereof is transmitted from the server A100 to the server B200; and, on the basis of the received information, the server B200 generates a processing load expected to occur at the time when the virtual machine 123 runs. With this configuration, the server B200 can reflect the processing load of the virtual machine 123, which is actually in operation in the server A100, and reproduce the processing load at the time when the virtual machine 123 runs.

Further, in this exemplary embodiment, the server A 100 transmits the load information in an intermittent manner, and every time the load information is received, the server B200 estimates a new processing load based on the received load information, and increases or decreases the generated processing load. With this configuration, the server B200 can reproduce the processing load of the server A100 caused by the virtual machine 123 in almost real time. The term "almost real time" as used herein means that the timing is not a completely real time since there occurs a slight time lag due to various kinds of information transmission and information processing. Therefore, even if environmental conditions including a condition of the network 500 vary from time to time and the resource amount of the server A100 that the virtual machine uses varies, the server B200 can reproduce the processing load in accordance with these variations.

[Second Exemplary Embodiment]

Figure 4:
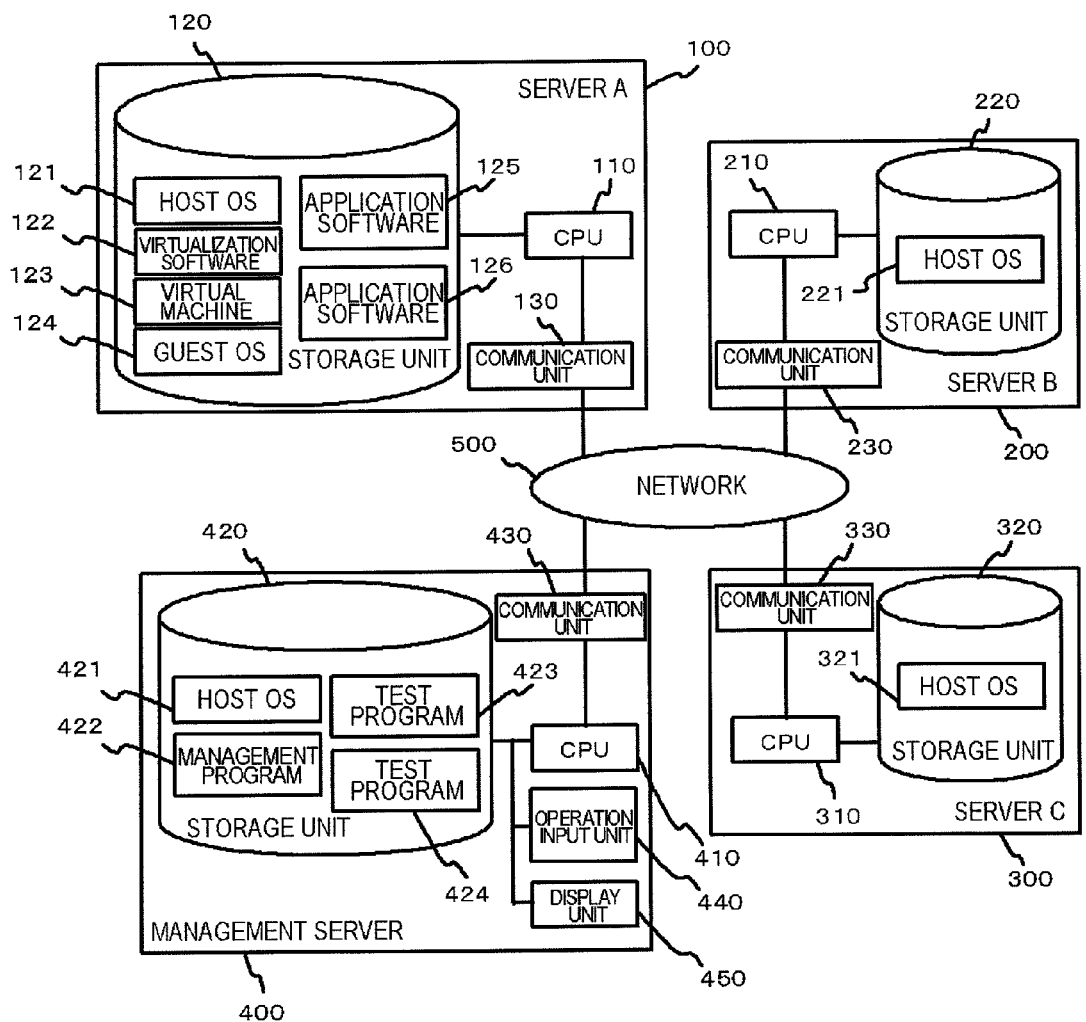
FIG. 4 is a configuration diagram of an information processing system according to a second exemplary embodiment.

FIG. 4 is a configuration diagram of an information processing system 2000 according to a second exemplary embodiment. The information processing system 2000 has the server A100, the server B200, a server C300, and a management server 400, which are communicatively connected with each other through a network 500.

The server A100 is a device equivalent to the server A100 according to the first exemplary embodiment. The server B200 is a device equivalent to the server B200 according to the first exemplary embodiment, except that the test program 223 is not stored in the storage unit 220. The server C300 is a device equivalent to the server B200 according to this exemplary embodiment, and includes a CPU 310, a storage unit 320, and a communication unit 330, the storage unit 320 storing a host OS 321, which is an operation system installed in the server C300.

The management server 400 includes a CPU 410, a storage unit 420, a communication unit 430, an operation input unit 440, and a display unit 450. The storage unit 420 stores a host OS 421, which is an operation system installed in the management server 400, and further stores a management program 422, and test programs 423 and 424. Note that the test programs 423 and 424 are programs equivalent to each other.

The display unit 450 outputs a display such as an operation screen to a manager of the information processing system 2000. More specifically, the display unit 450 may include a display device.

The operation input unit 440 receives an operation input from the manager of the information processing system 2000. More specifically, the operation input unit 440 may include a keyboard, a mouse pad, a touch panel and the like. Note that, the management server 400 may accordingly display an operation screen on the display unit 450 so as to receive the operation input made by the manager from the operation input unit 440.

The test programs 423 and 424 each generate a processing load according to input of an index value $I_n$, and increase or decrease the being-generated processing load according to the magnitude of the index value $I_n$. The index value $I_n$ is a general name of index values used to cause the test program according to the present invention to generate the processing load. For the index values appearing hereinafter, numerals, alphabet or the like such as $I_1$ and $I_4$ will be separately attached in lieu of the character n to differentiate one from another.

Upon activation of the management program 422 by the CPU 410, the management server 400 operates in the following manner. First, the management server 400 transmits the test program 423 or the test program 424 to the server B200 or the server C300, which is selected in accordance with the operation input received with the operation input unit 440. In this exemplary embodiment, a description will be made on the assumption that the test program 423 is transmitted to the server B200 and the test program 424 is transmitted to the server C300. In other words, the management server 400 that runs the management program 422 functions as a test-program transmitting unit in the present invention.

The server B200 stores the test program 423 in a part of the storage area of the storage unit 220. The server C300 stores the test program 424 in a part of the storage area of the storage unit 320. In other words, the storage unit 220 and the storage unit 320 function as a test-program storing unit in the present invention.

Next, the management server 400 that runs the management program 422 transmits, to the server A100, a request to transmit the load information to the server B200 that has transmitted the test program 423 and to the server C300 that has transmitted the test program 424. In other words, the management server 400 that runs the management program 422 functions as a load-information transmission requesting unit in the present invention.

The server A100 transmits the load information to the server B200 and the server C300 in response to the received request.

More specifically, in the case where a first index value $I_1$ is input into the test program 423 or 424 in the server A100, the server A100 stores in advance, in a part of the storage area of the storage unit 120, the first index value $I_1$ and a first resource amount $P_1$ indicative of the amount of resource in the server A100 consumed by the processing load generated by the test program 423 or 424 in a manner that the first index value $I_1$ and the first resource amount $P_1$ are associated with each other. In other words, the storage unit 120 functions as a calculation criterion storing unit in the present invention.

In order to obtain the first resource amount $P_1$ and the first index value $I_1$, the server A100 may run the test program 423 or a test program equivalent to the test program 423 prior to running the virtual machine, and measures the first resource amount $P_1$ and the first index value $I_1$. Alternatively, the server A100 may receive the first resource amount $P_1$ and the first index value $I_1$ from an external device through the network 500.

The server A100 obtains a second resource amount $P_2$ indicative of the amount of resource in the server A100 consumed by running the virtual machine 123. The server A 100 calculates a second index value $I_2$ corresponding to the obtained second resource amount $P_2$ on the basis of the first resource amount $P_1$ and the first index value $I_1$ stored in the storage unit 120, and transmits the calculated second index value $I_2$ as the load information to the server B200 or the server C300.

Next, a calculation method will be described specifically. The server A100 calculates the second index value $I_2$ by multiplying the obtained second resource amount $P_2$ by a ratio of the first index value $I_1$ to the first resource amount $P_1$. In other words, the second index value $I_2$ can be obtained through the following expression (2).

[Expression 2]

$$I_2 = P_2 \times I_1 / P_1 \qquad (2)$$

The server B200 reads out the test program 423 from the storage unit 220, and inputs the index value (second index value $I_2$) received from the server A100 into the read-out test program 423, thereby to generate the processing load. The server C300 reads out the test program 424 from the storage unit 320, and inputs the index value (second index value $I_2$) received from the server A100 into the read-out test program 424, thereby to generate the processing load.

The server B200 transmits a third resource amount $P_{31}$ indicative of the amount of resource in the server B200 consumed by the generated processing load to the management server 400. The server C300 transmits a third resource amount $P_{32}$ indicative of the amount of resource in the server C300 consumed by the generated processing load to the management server 400. Transmission of the third resource amount $P_{31}$ and the third resource amount $P_{32}$ by the server B200 and the server C300, respectively, may be performed at constant intervals, or may be performed at random intervals. In this exemplary embodiment, the servers (server B200 and server C300) transmit them at a time interval $T_2$.

The management server 400 that runs the management program 422 receives the third resource amounts $P_{31}$ and $P_{32}$ from the server B200 that has received the test program 423, and the server C300 that has received the test program 424, respectively. The management server 400 displays and outputs the received third resource amounts $P_{31}$ and $P_{32}$ through the display unit 450 to provide the manager with the information. In other words, the management server 400 that runs the management program 422 functions as a resource amount receiving unit and a resource amount providing unit in the present invention.

The management server 400 intermittently receives the third resource amount $P_{31}$, $P_{32}$ from the server B200 or the server C300. The management server 400 provides the manager with the received third resource amount $P_{31}$, $P_{32}$ every time it receives the third resource amount $P_{31}$, $P_{32}$. The expression "intermittently" as used herein means constant time intervals or means random time intervals. In this exemplary embodiment, the server B200 or the server C300 transmits the third resource amount $P_{31}$, $P_{32}$ at the time interval $T_2$. However, since the timings thereof are not synchronized, the management server 400 receives the third resource amounts $P_{31}$ and $P_{32}$ at different time intervals.

Figure 5:
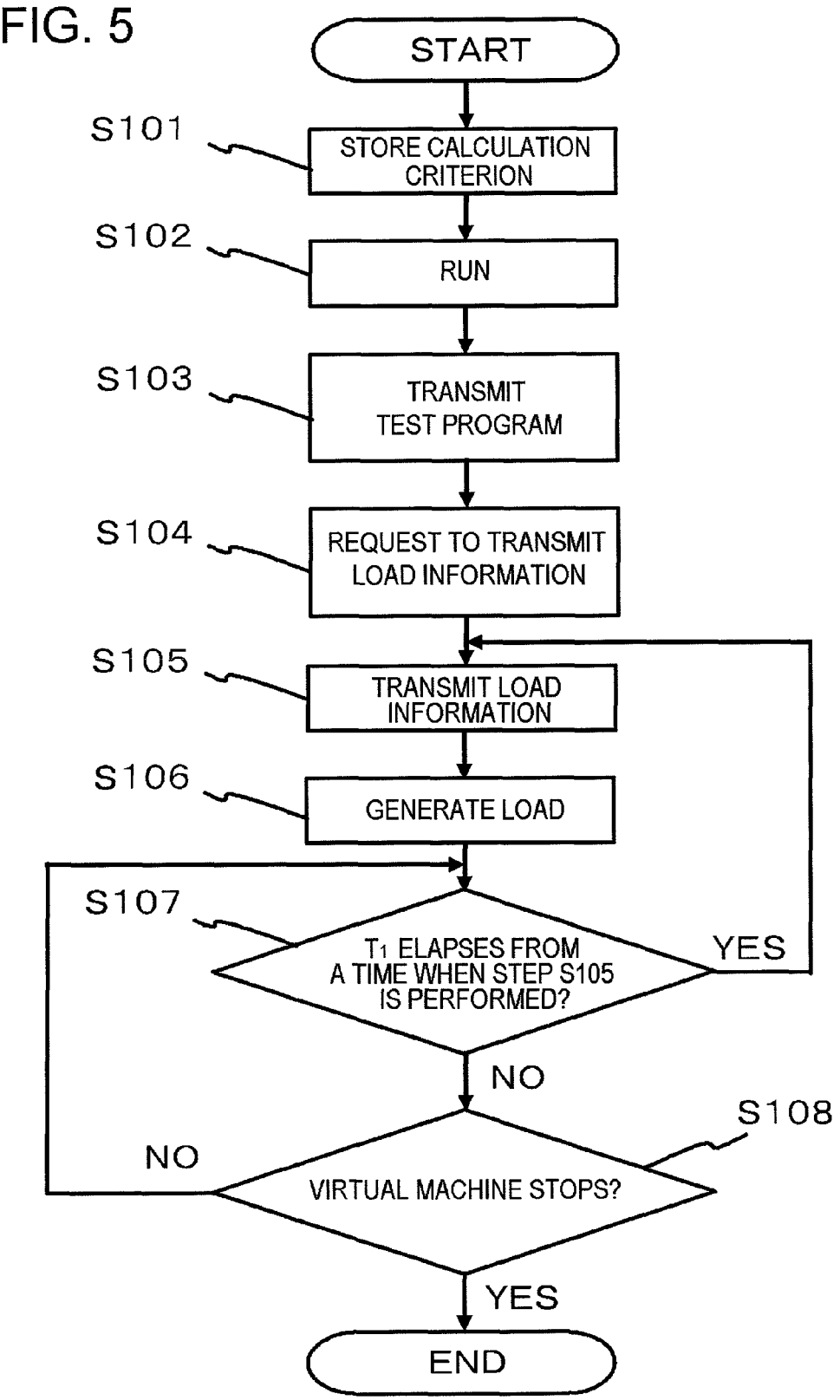
FIG. 5 is a flowchart illustrating an information processing method applied to the information processing system according to the second exemplary embodiment.

FIG. 5 is a flowchart of an information processing method applied to the information processing system 2000 according to the second exemplary embodiment.

In the case where the first index value $I_1$ is input into the test program 423, 424 in the server A100, the information processing method performs steps including a calculation criterion storing step (step S101) of storing the first index value $I_1$ and the first resource amount $P_1$ indicative of the amount of resource in the server A100 consumed by the processing load generated by the test programs 423 and 424 in a manner that they are associated with each other.

The information processing method includes a running step (step S102) in which the server A100 runs the virtual machine 123. Note that, in the running step (step S102), the server A100 may autonomously run the virtual machine 123, or may receive a running request from the management server 400 and run the virtual machine 123 in accordance with the received request.

The information processing method includes a test program transmitting step (step S103) in which the management server 400 that receives an operation input from the manager transmits the test program 423 or the test program 424 to the server B200 or the server C300 selected in accordance with the received operation input. Note that, in the test program transmitting step (step S103) in this exemplary embodiment, the management server 400 transmits the test program 423 to the server B200, and transmits the test program 424 to the server C300. Naturally, the server B 200 stores the received test program 423 in the storage unit 220, and the server C300 stores the received test program 424 in the storage unit 320.

The information processing method includes a load-information transmission request step (step S104) in which the management server 400 transmits, to the server A 100, a request to transmit the load information to the server B200 and the server C300, which receive the test program 423 and the test program 424, respectively, in the test program transmitting step (step S103).

The information processing method includes a load-information transmitting step (step S105) in which the server A100 transmits the load information to the server B200 and the server C300 in response to the request transmitted in the load-information transmitting request step (step S104).

It should be noted that, in the load-information transmitting step (step S105), the server A100 transmits an index value $I_n$ input to the test program 423 or the test program 424 as the load information. More specifically, in the load-information transmitting step (step S105), the second resource amount $P_2$ indicative of the amount of resource in the server A100 consumed as a result of running the virtual machine 123 is obtained; the second index value $I_2$ corresponding to the obtained second resource amount $P_2$ is calculated on the basis of the first resource amount $P_1$ and the first index value $I_1$ stored in the calculation criterion storing step (step S101); and, the calculated second index value $I_2$ is transmitted to the server B200 as the load information.

The information processing method includes a load generating step (step S106) in which the server B200 or the server C300 reads out the test program 423 or the test program 424, and the index value (second index value $I_2$) transmitted in the load-information transmitting step (step S105) is input into the read-out test program 423 or test program 424 to generate the processing load.

The server B200 and the server C300 keep generating the processing load generated in the load generating step (step S106) from a time when the load-information transmitting step (step S105) is performed to a time when the time $T_1$ elapses (NO in step S107).

When the time $T_1$ elapses from the time when the load-information transmitting step (step S105) (YES in step S107), the server A100 performs the load-information transmitting step (step S105) again. The server B200 or the server C300 increases or decreases the processing load generated in the load generating step (step S106) according to the received load information every time it receives the load information transmitted in the load-information transmitting step (step S105).

The information processing method is repeatedly performed while the virtual machine 123 executed in the running step (step S102) is running (NO in step S108). However, upon stopping of the virtual machine 123 (YES in step S108), this information processing method ends.

Figure 6:
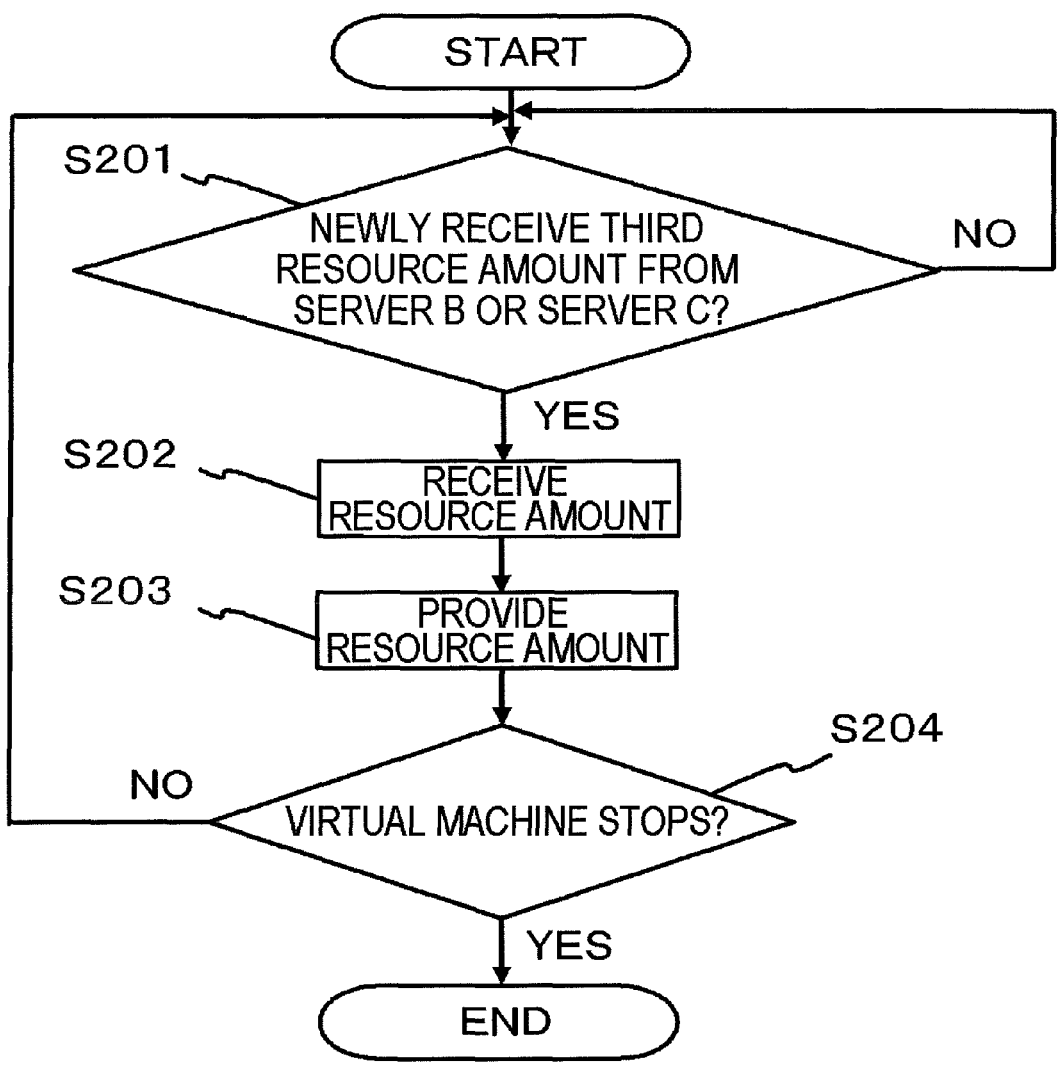
FIG. 6 is a flowchart illustrating the information processing method applied to the information processing system according to the second exemplary embodiment.

FIG. 6 is a flowchart of the information processing method applied to the information processing system 2000 according to the second exemplary embodiment. This information processing method includes a resource amount receiving step (step S202) in which the management server 400 receives a third resource amount $P_{31}$ indicative of the amount of resource in the server B200 consumed by the processing load generated in the load generating step (step S106) or a third resource amount $P_{32}$ indicative of the amount of resource in the server C300 consumed by the processing load generated in the load generating step (step S106). In the resource amount receiving step (step S202) according to this exemplary embodiment, the management server 400 receives the third resource amounts $P_{31}$ and $P_{32}$ from the server B200 that receives the test program 423 and the server C 300 that receives the test program 424, respectively.

The information processing method includes a resource amount providing step (step S203) in which the management server 400 provides the manager with the third resource amount $P_{31}$, $P_{32}$ received in the resource amount receiving step (step S202).

The information processing method is in a standby state during a time when the third resource amount $P_{31}$, $P_{32}$ is newly received from the server B200 or the server C300 (NO in step S201). Upon newly receiving the third resource amount $P_{31}$, $P_{32}$ from the server B200 or the server C300 (YES in step S201), the process proceeds to the resource amount receiving step (step S202). Then, the resource amount receiving step (step S202) is intermittently repeated.

Then, in the resource amount providing step (step S203), the received third resource amount $P_{31}$, $P_{32}$ is provided to the manager every time the third resource amount $P_{31}$, $P_{32}$ is received.

As is the case in the flowchart in FIG. 5, the information processing method is repeatedly performed while the virtual machine executed in the running step (step S102) is running (NO in step S204). However, upon stopping of the virtual machine (YES in step S204), the information processing method ends.

Next, effects of this exemplary embodiment will be described. In this exemplary embodiment, the server A100 transmits the index value $I_n$ as the load information, and the server B200 or the server C300 runs the test program by inputting the received index value $I_n$ into the test program and generates the processing load. With this configuration, it is only necessary for the server A100 to transmit the same index value In to the server B200 or the server C300. This makes it possible to reduce the calculation process, and to lower the data volume of the load information transmitted/received between the servers. Further, in the server B200 or the server C300, processes performed prior to generating the load can be reduced, whereby it is possible to rapidly generate the processing load. This leads to a reduction in the time lag from a time when the processing load caused by the virtual machine 123 is generated in the server A100 to a time when the server B200 or the server C 300 reproduces this processing load, whereby it is possible to perform the reproduction further nearly in real time.

Further, in this exemplary embodiment, the server A 100 stores the first resource amount $P_1$ and the first index value $I_1$ in advance in a manner that they are associated with each other. Therefore, the process of calculating the second index value $I_2$ can be simplified, and hence, can be reduced. This leads to a reduction in the time lag from a time when the processing load caused by the virtual machine 123 is generated in the server A100 to a time when the server B200 or the server C300 reproduces the processing load, whereby it is possible to perform the reproduction further nearly in real time.

Yet further, in this exemplary embodiment, the test program can be transmitted to the server selected in accordance with the operation input from the operator. This makes it possible to reproduce the processing load of the virtual machine 123 in a manner that reflects the intention of the operator.

Yet further, in this exemplary embodiment, the resource amount consumed by the reproduced processing load can be provided to the operator. This makes it possible for the operator to check the resource amount consumed by the reproduced processing load.

Yet further, in this exemplary embodiment, the plural servers (server B200 and server C300) each run the equivalent test program to reproduce the processing load of the virtual machine 123. This makes it possible to reproduce the processing load of the virtual machine 123 in parallel in the plural servers.

Yet further, in this exemplary embodiment, every time the third resource amount $P_{31}$, $P_{32}$ consumed by the reproduced processing load is received, the received third resource amount is provided to the operator. This makes it possible for the operator to check, for each reception, the third resource amount $P_{31}$, $P_{32}$ updated nearly in real time.

[Third Exemplary Embodiment]

Figure 7:
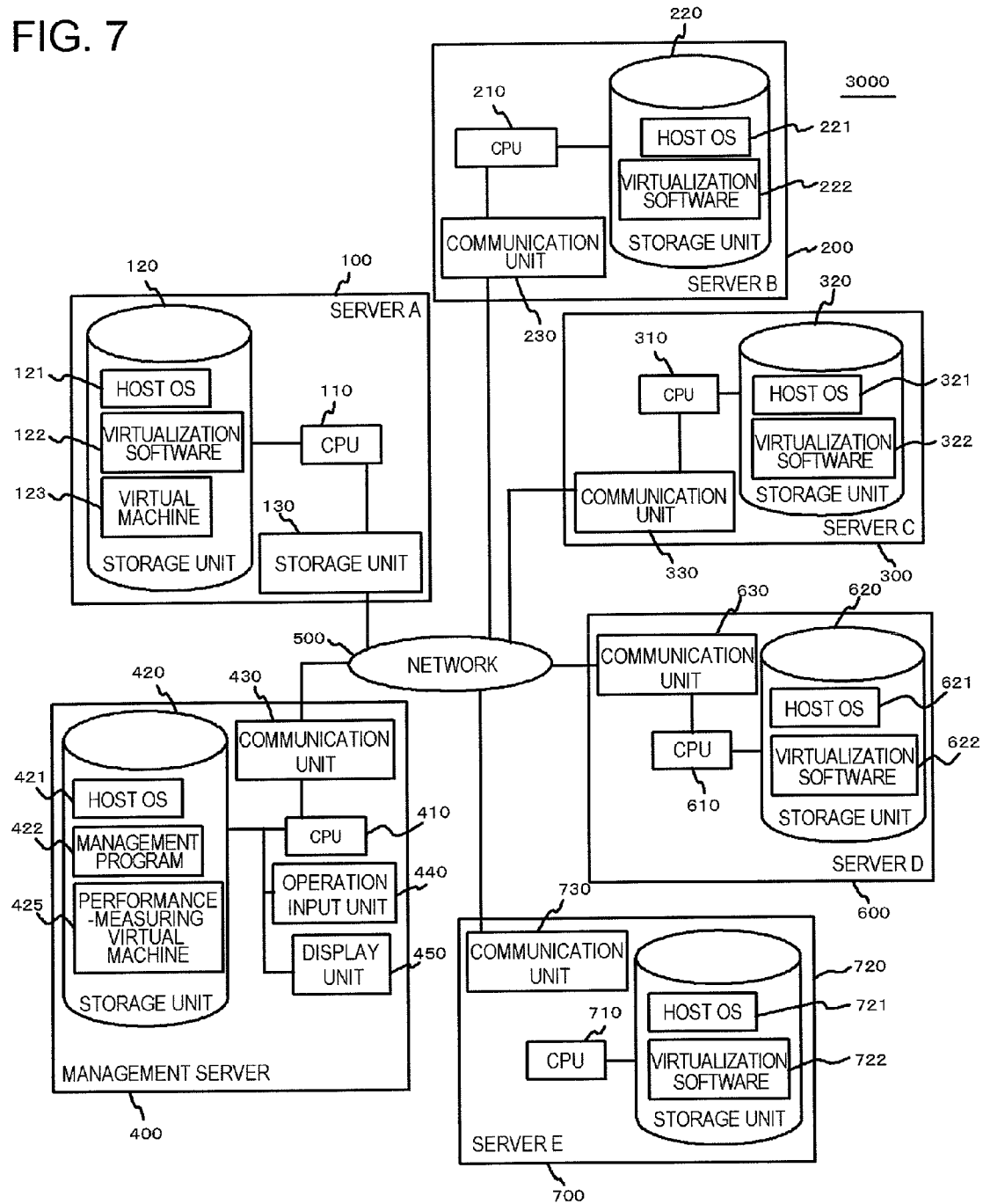
FIG. 7 is a configuration diagram of an information processing system according to a third exemplary embodiment.

FIG. 7 is a configuration diagram of an information processing system 3000 according to a third exemplary embodiment. The server A100, the server B200, the server C300, a server D600, the management server 400, and a server E700 are connected to each other through the network 500 in a manner that they can communicate with each other.

The server A100, the server B200, the server C300, the management server 400, the server D 600, and the server E700 have the CPU 110, the CPU 210, the CPU 310, the CPU 410, a CPU 610, and a CPU 710, respectively. The CPUs may have the same processing performance, or may have different processing performances.

Further, the server A100, the server B200, the server C300, the management server 400, the server D600, and the server E700 have the storage unit 120, the storage unit 220, the storage unit 320, the storage unit 420, a storage unit 620, and a storage unit 720, respectively. The storage units may have the same storage capacity, or may have different storage capacities.

Yet further, the server A100, the server B200, the server C300, the management server 400, the server D600, and the server E700 have the communication unit 130, the communication unit 230, the communication unit 330, the communication unit 430, a communication unit 630, and a communication unit 730, respectively. The communication amount that these units can process may be the same, or may be different.

The storage unit 120 stores the host OS 121, the virtualization software 122, and the virtual machine 123. Although not illustrated herein, the virtual machine 123 includes software corresponding to the guest OS 124 and the application software 126 illustrated in FIG. 1 or FIG. 4.

The storage unit 220 stores the host OS 221 and virtualization software 222, and the server B200 has an environment where virtual hardware such as the virtual machine 123 can be realized as is the case with the server A 100. Further, the storage unit 320 stores the host OS 321 and virtualization software 322, and the server C300 has an environment where virtual hardware can be realized as is the case with the server A100. Yet further, the storage unit 620 stores a host OS 621 and virtualization software 622, and the server D600 has an environment where virtual hardware can be realized as is the case with the server A 100. Yet further, the storage unit 720 stores a host OS 721 and virtualization software 722, and the server E700 has an environment where virtual hardware can be realized as is the case with the server A100.

In addition to the CPU 410, the storage unit 420 and the communication unit 430 described above, the management server 400 has the operation input unit 440 and the display unit 450. The operation input unit 440 and the display unit 450 in this exemplary embodiment correspond to the operation input unit 440 and the display unit 450 in the second exemplary embodiment, respectively.

The storage unit 420 stores a performance-measuring virtual machine 425. The performance-measuring virtual machine 425 is virtual hardware, and on the virtual hardware, it is possible to run a test program equivalent to the test program 423 described in the second exemplary embodiment.

Further, the storage unit 420 stores the host OS 421 and the management program 422. The CPU 410 runs the management program 422 on the host OS 421, whereby the management server 400 operates in the following manner.

Figure 8:
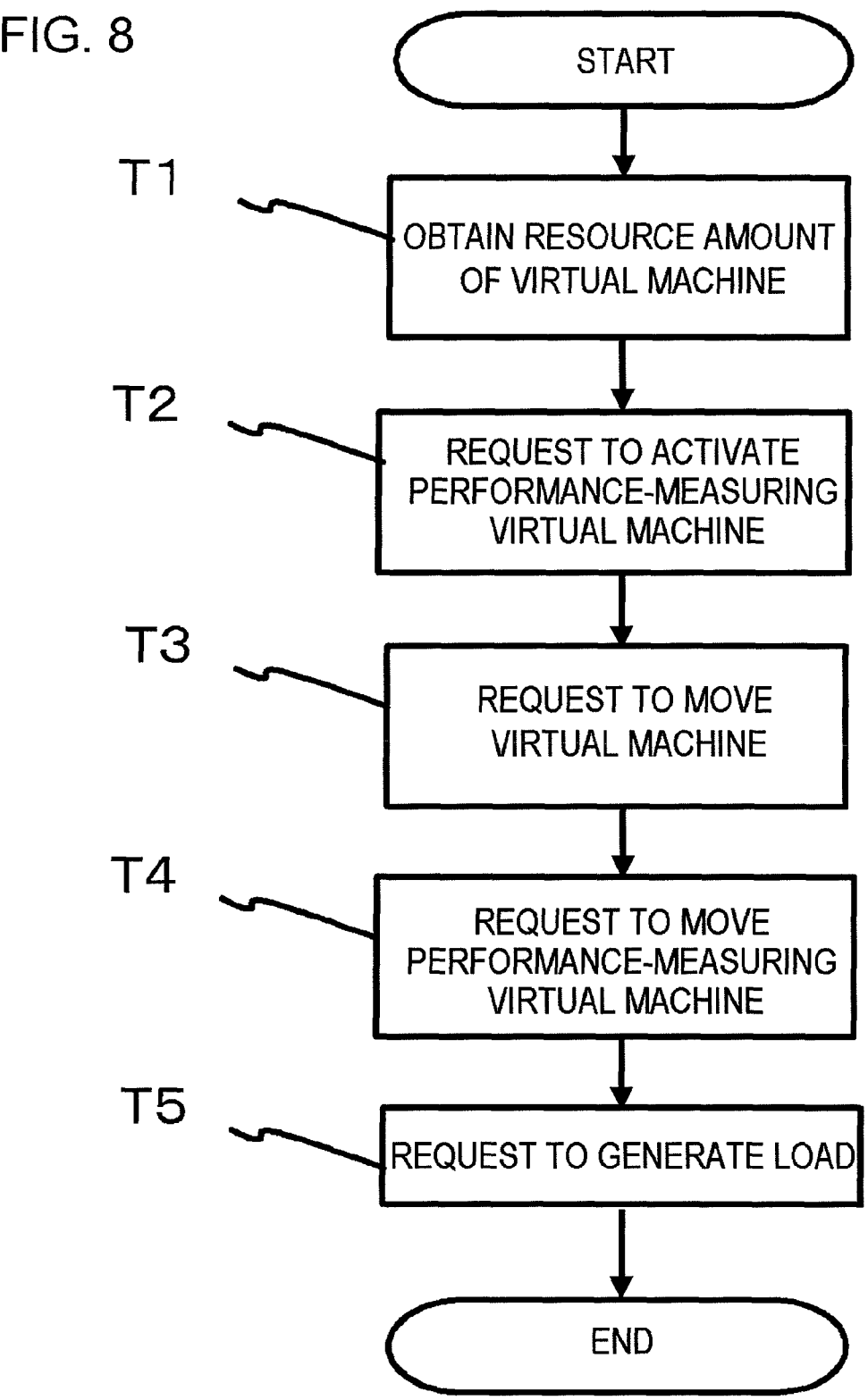
FIG. 8 is a flowchart illustrating operations of a management server at the time when a performance-measuring virtual machine is transferred to a server A.

FIG. 8 is a flowchart illustrating operations of the management server 400 at the time when the performance-measuring virtual machine 425 is transferred to the server A100. First, the management server 400 obtains, from the server A100, an amount of resource consumed as a result of running the virtual machine 123 in the server A 100 (step T1).

The management server 400 makes a copy of an image of the performance-measuring virtual machine 425 registered in the storage unit 420 on the storage unit 720 of the server E700. The management server 400 requests the server E700 to activate the performance-measuring virtual machine 425 (step T2).

Then, the management server 400 requests the server A100 and the server D600 to move the virtual machine 123 running on the server A100 to the server D 600 (step T3).

Then, the management server 400 requests the server A100 and the server E700 to move the performance-measuring virtual machine 425 on the server E700 to the server A100 (step T4).

The management server 400 requests the performance-measuring virtual machine 425 moved to the server A100 to generate a processing load with the resource amount obtained in the step T1 as a target value. Further, the management server 400 requests the server A100 and the performance-measuring virtual machine 425 to periodically obtain the resource amount consumed as a result of running the performance-measuring virtual machine 425 in the server A100 (step T5).

Figure 9:
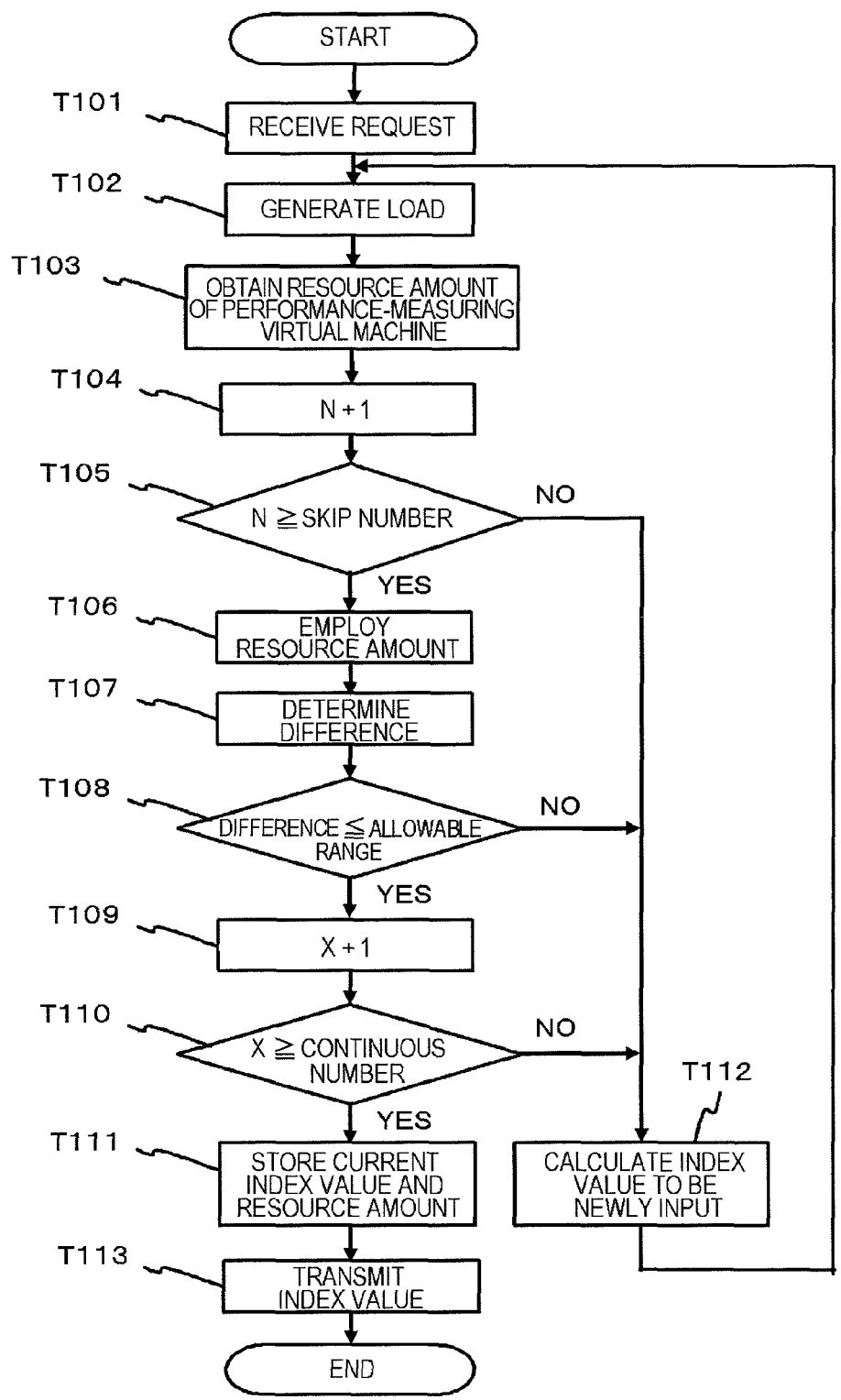
FIG. 9 is a flowchart illustrating operations of the performance-measuring virtual machine.

FIG. 9 is a flowchart illustrating operations of the performance-measuring virtual machine 425 running on the server A100. First, the performance-measuring virtual machine 425 receives a request from the management server 400 in step T5 (step T101).

The performance-measuring virtual machine 425 generates the processing load in response to the request received in step T101 (step T102). Note that a first index value $I_F$ inputted at the time of activating the test program on the performance-measuring virtual machine 425 is set in advance. The first index value $I_F$ may be provided from the management server 400 to the performance-measuring virtual machine 425 in step T5, or may be included in the performance-measuring virtual machine 425 in advance.

The performance-measuring virtual machine 425 obtains the resource amount consumed as a result of running the performance-measuring virtual machine 425 in the server A 100 in response to the request received in step T101 (step T103).

Upon obtaining the resource amount in step T103, the performance-measuring virtual machine 425 adds one to the number N of times the resource amount is obtained (step T104). Then, if the value of N is more than or equal to a skip number set in advance (YES in step T105), the amount of consumed resource obtained in step T103 is employed (step T106). On the other hand, if the value of N does not reach the skip number set in advance (NO in step T105), an index value $I_A$ to be newly input into the performance-measuring virtual machine 425 is calculated (step T112). The process is in the standby state until step T103 is performed. The expression (2) is used for the calculation in step T112. More specifically, $I_2=I_A$/where $I_1$ is equal to a current index value $I_B$ ($I_B=I_F$ in the first round); $P_1$ is equal to the resource amount obtained in step T103; and, $P_2$ is equal to a target value of the resource amount received in step T101.

The performance-measuring virtual machine 425 compares the latest resource amount employed in step T106 with the resource amount employed in step T106 in the previous time to determine whether the difference thereof falls within an allowable range set in advance (step T107). If the difference does not fall within the allowable range (NO in step T108), an index value $I_A$ to be newly input in the performance-measuring virtual machine 425 is calculated (step T112). This calculation is performed in the manner described above.

If the difference falls within the allowable range (YES in step T108), one is added to number X of favorable determination result (step T109). If the value of X does not reach a continuous number set in advance (NO in step 110), an index value $I_A$ to be newly input in the performance-measuring virtual machine 425 is calculated (step T112). This calculation is performed in the manner described above.

Upon calculating the index value $I_A$ in step T112, the process proceeds again to step T102, and then, the performance-measuring virtual machine 425 inputs the calculated index value $I_A$ into the test program, and increases or decreases the being-generated processing load. Thereafter, the process repeatedly performs steps after step T103. If it is determined to be NO again in step T105, step T108 or step T110, an index value $I_A$ to be newly inputted is calculated in step T112 with the index value $I_A$ inputted in step T102 as the current index value $I_B$.

By performing step T103 through step T110, it is possible to obtain the resource amount corresponding to the index value inputted in step T102 (the index value $I_F$ in the first round, and the index value $I_A$ calculated in step T112 in the second round and thereafter). Further, with step T105, it is possible to ignore the resource amount obtained before reaching the processing load. With step T108, the generated load can be brought into the predetermined range, whereby it is possible to improve the accuracy. With step T110, it is possible to check whether or not the generated load is in a stable state. Further, the skip number, the allowable range, and the continuous number described above may be a fixed default number, or may be a value that can be changed as needed by the operator.

If a value of the number X of favorable determination result is more than or equal to the predetermined continuous number after addition of one to the number X of favorable determination result in step T109 (YES in step T110), the performance-measuring virtual machine 425 stores the current index value $I_B$ and the latest resource amount employed in step T106 in a part of the storage area in the storage unit 120 in a manner that they are associated with each other (step T111). In other words, step T111 corresponds to the calculation criterion storing step S101 described in the second exemplary embodiment.

The index number $I_B$ stored in step T111 is transmitted to the management server 400 (step T113).

Figure 10:
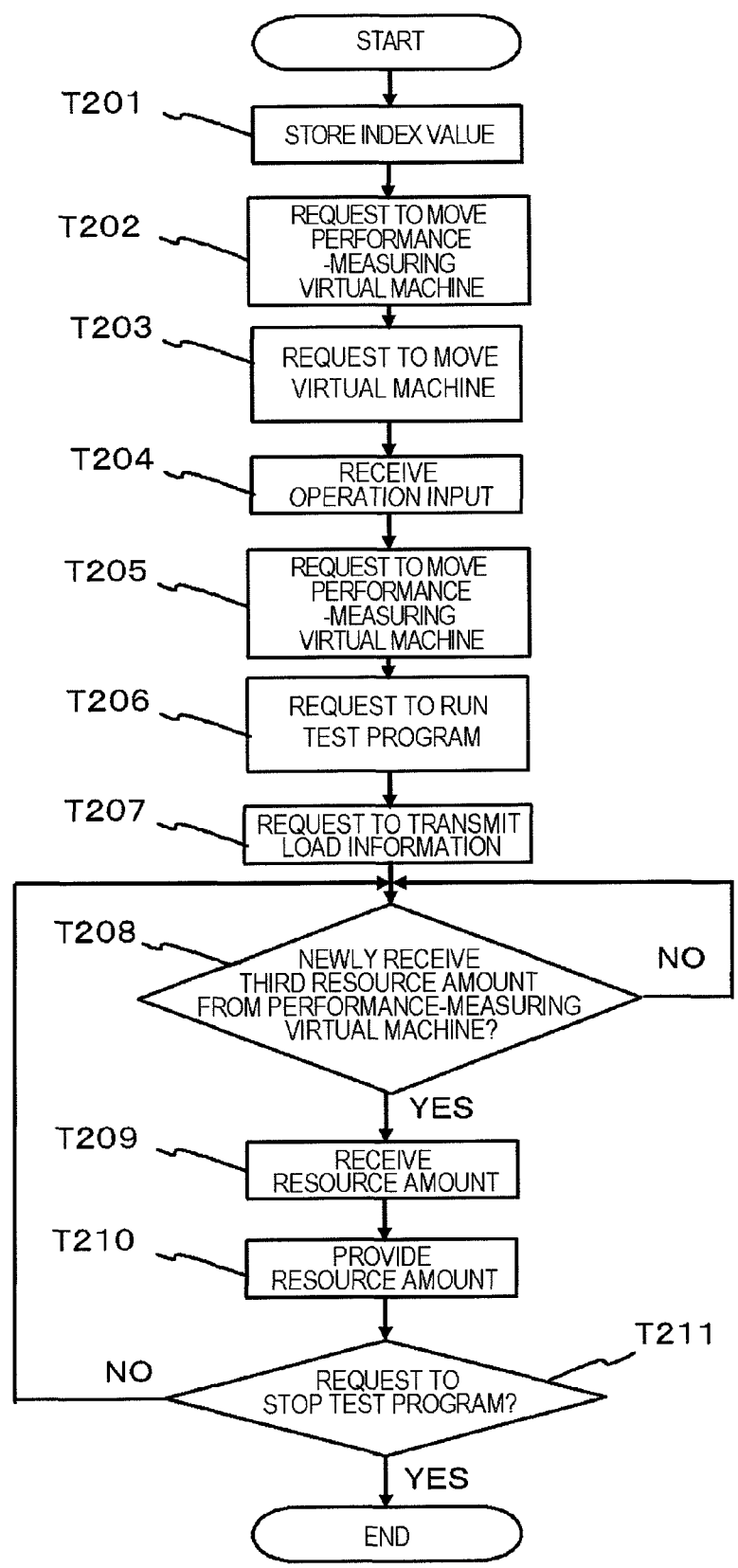
FIG. 10 is a flowchart illustrating operations of the management server at the time when the performance-measuring virtual machine is transferred to a server B.

FIG. 10 is a flowchart illustrating operations of the management server 400 at the time of transferring the performance-measuring virtual machine 425 to the server B 200. The management server 400 stores the index value $I_B$ transmitted in step T113 in a part of the storage area of the storage unit 420 (step T201).

Next, the management server 400 requests the server A100 and the sever E700 to transfer the performance-measuring virtual machine 425 on the sever A100 to the server E700 (step T202).

Then, the management server 400 requests the server D600 and the server A100 to transfer the virtual machine 123 on the server D600 to the server A100 (step T203). With this configuration, the virtual machine 123, which has run on the server D600, runs on the server A100. In other words, step T203 corresponds to step S102 described in the second exemplary embodiment.

Upon receiving an operation input from the operator (step T204), the management server 400 makes a request to transfer the performance-measuring virtual machine 425 on the server E700 to a server selected according to the received operation input (step T205). In this exemplary embodiment, the sever B200 is selected, and the performance-measuring virtual machine 425 is transferred to the sever B200. The performance-measuring virtual machine 425 can run a test program equivalent to the test program 423 in the second exemplary embodiment, and hence, step T205 corresponds to step S103 in the second exemplary embodiment.

The management server 400 transmits the index value $I_B$ stored in the step T201 to the performance-measuring virtual machine 425, and makes a request to input the index value $I_B$ into the test program to run the test program (step T206). In other words, as the management server 400 transmits the index value $I_B$ to the performance-measuring virtual machine 425, the management server 400 realizes a test-program running request unit in the present invention.

Then, the management server 400 requests the server A 100 to transmit an index value $I_C$ from the server A100 to the performance-measuring virtual machine 425 (server B 200) (step T207). In other words, step T207 corresponds to step S104 in the second exemplary embodiment. Note that the index value $I_C$ means an index value corresponding to the resource amount that the performance-measuring virtual machine 425 periodically obtains.

The management server 400 performs step T201 through step T207, whereby it is possible to reproduce, on the server B200, the processing load of the virtual machine 123 running on the server A100. This reproduction corresponds to step S105 to step S107 in the second exemplary embodiment.

More specifically, in response to a request transmitted in step T207, the server A100 obtains the resource amount in the server A100 itself consumed as a result of running the virtual machine 123 for each time $T_1$, calculates the index value $I_C$ corresponding to the obtained resource amount on the basis of the resource amount and the index value $I_B$ stored in step T111, and transmits the calculated index value $I_C$ to the server B200 as the load information. Note that Expression (2) described above is used in this calculation. The server B200 inputs the received index value $I_C$ into the test program of the performance-measuring virtual machine 425 every time the server B200 receives the index value $I_C$ from the server A 100, and increases or decreases the processing load with lapse of time.

It should be noted that the processes concerning the reproduction described above are processes running on the server A100 (virtual machine 123) or the server B200 (performance-measuring virtual machine 425). Therefore, these processes are not illustrated in the flowchart in FIG. 10, which illustrates the operations of the management server 400.

The management server 400 is in the standby state while the management server 400 does not receives the third resource amount $P_{31}$ from the performance-measuring virtual machine 425 (server B200) (NO in step T208). Further, if receiving the third resource amount $P_{31}$ from the performance-measuring virtual machine 425 (server B200) (YES in step T208), the management server 400 performs a process of receiving the third resource amount $P_{31}$ (step T209), and displays and outputs the received third resource amount $P_{31}$ through the display unit 450 to provide the operator with the third resource amount $P_{31}$ (step T210). In other words, a set of processes described in this paragraph corresponds to step S201 to step S203 in the second exemplary embodiment.

The management server 400 repeatedly performs the reproduction operation described above on the server A100 and the server B200 while the management server 400 does not transmit, to the performance-measuring virtual machine 425, a request to stop the test program (NO in step T211).

Once the management server 400 transmits, to the performance-measuring virtual machine 425, the request to stop the test program (YES in step T211), the performance-measuring virtual machine 425 stops the test program, and the above-described reproduction operation ends.

Next, effects of this exemplary embodiment will be described. In this exemplary embodiment, as the management server 400 directly makes a request to run the test program, it is possible to control the timing for generating the processing load by the test program. Therefore, for example, in a case where the test program is run in plural servers, it is possible to synchronize the timings for starting the test program.

Further, a copy of the performance-measuring virtual machine 425 is transferred to the server B200 while the performance-measuring virtual machine 425 is running on the other server. Therefore, it is possible to cause the processing load with a more rapid rise.

Further, in this exemplary embodiment, the index value $I_B$ is calculated after the performance-measuring virtual machine 425 is transferred to the server A100. Then, the performance-measuring virtual machine 425 is transferred to the server B200 to generate the processing load on the basis of the index value $I_B$. Therefore, it is possible to accurately reproduce the processing load of the virtual machine 123 from the moment when the processing load begins to occur.

The exemplary embodiments according to the present invention have been described with reference to the drawings. However, these are merely examples of the present invention, and it is possible to employ various configurations other than those described above.

In the first to the third exemplary embodiments, the processing load is generated on the basis of the processing load or the utilization rate of the CPU 110 of the server A100. However, it may be possible to perform a similar process on the basis of a value related to the other resource. Here, the term "other resource" means, for example, the amount of memory usage in the sever A 100, a storage capacity of the hard disk of the server A100, the volume of communication between the server A100 and the network 500. It may be possible to use any one of the resources described above, or may be possible to use a combination thereof.

In the first to the third exemplary embodiments, it has been described that all the servers having an environment where the virtual machine can run have the host OS and the virtualization software. However, it may be possible to use software in which all of them are integrated into one.

In the second exemplary embodiment, only the server C300 has been described with reference to the drawings as a server equivalent to the server B200. However, it may be possible to further add a server similar to the server B200. Then, a test program similar to the test program 423 may be transmitted to these servers, thereby to realize a process similar to the test program 423 in the second exemplary embodiment.

In the third exemplary embodiment, a description has been made by selecting the server D600 as the server for saving the virtual machine 123, the server E700 as the server for pooling the performance-measuring virtual machine 425, the server A100 as the server for running the virtual machine 123, and the server B200 as the server for running the performance-measuring virtual machine 425. However, this exemplary embodiment is not limited to this, and other combination may be possible.

In the second exemplary embodiment, it has been described that the third resource amount $P_{31}$, $P_{32}$ is displayed and outputted by using the display unit 450 as the resource amount providing unit. However, this exemplary embodiment is not limited to this. For example, the third resource amount $P_{31}$, $P_{32}$ may be output by voice using a speaker. Alternatively, the third resource amount $P_{31}$, $P_{32}$ may be output by print using a printer. Alternatively, it may be possible to combine plural manners from among the display output, the voice output, and the print output.

In the second and the third exemplary embodiments, it has been described that the CPU 410 runs the management program 422 to realize the functions of the management server 400. However, it may be possible to form each of the functions by a piece of hardware specific to each of the functions. Alternatively, it may be possible to realize them by combining software with hardware.

In the third exemplary embodiment, with reference to the flowchart illustrated in FIG. 9, it has been described that the processes of step T104 and step T105 are performed every time the resource amount is obtained in step T103. However, this exemplary embodiment is not limited to this. It may be possible to employ a configuration in which step T104 and step T105 are performed only when the resource amount concerning the load generated by inputting the first index value $I_F$ in step T102 is obtained in step T103, and thereafter, step T104 and step T105 are not performed.

In the third exemplary embodiment, it has been described that an image of the performance-measuring virtual machine 425 is duplicated in the storage unit of the destination server when the management server 400 moves the performance-measuring virtual machine 425 to the other server device. However, by applying a Live-Migration technique, it may be possible to move the performance-measuring virtual machine 425 itself.

It should be noted that, naturally, the exemplary embodiments and plural modification examples thereof described above may be combined with each other, provided that contents thereof do not contradict each other. Further, in the exemplary embodiments and modification examples thereof, functions of the constituting elements have been specifically described. These functions may be changed within the scope that satisfies the present invention.

Further, in the information processing method according to the present invention, plural steps are specified in a sequential order. However, this specified order does not limit the order in which the plural steps are performed. Therefore, at the time of performing the information processing method according to the present invention, the order of the plural steps may be changed, provided that the change does not impair the details.

The present application claims priority based on Japanese Patent Application No. 2009-168497 filed with Japan Patent Office on Jul. 17, 2009, all of which disclosure is incorporated herein by reference.

The invention claimed is:

1. An information processing system comprising a first server and a second server that can communicate with each other through a network,
the first server including a processor comprising:
a running unit that runs a virtual machine; and,
a load-information transmitting unit that transmits, to the second server, load information indicative of a processing load generated in the first server as a result of running the virtual machine when the running unit runs the virtual machine, and,
the second server including a processor and a test program storing unit that stores a test program to generate a processing load in accordance with input of an index value and to vary the processing load in accordance with a magnitude of the index value, the processor comprising:
a load generating unit that generates a processing load corresponding to the load information received from the first server,
wherein:
the load-information transmitting unit transmits the index value as the load information; and
the load generating unit reads out the test program from the test program storing unit, inputs the index value received from the load-information transmitting unit into the read-out test program, and generates the processing load.

2. The information processing system according to claim 1, wherein:
the first server includes a calculation criterion storing unit that stores a first resource amount indicative of an amount of resource in the first server consumed by the processing load generated by the test program and a first index value in a manner that the first resource amount and the first index value are associated with each other in the case where the first index value is inputted into the test program in the first server; and
the load-information transmitting unit obtains a second resource amount indicative of the amount of resource in the first server consumed as a result of running the virtual machine, calculates a second index value corresponding to the obtained second resource amount on the basis of the first resource amount and the first index value stored in the calculation criterion storing unit, and transmits the calculated second index value to the second server as the load information.

3. The information processing system according to claim 2, wherein the load-information transmitting unit calculates the second index value by multiplying the obtained second resource amount by a ratio of the first index value to the first resource amount.

4. The information processing system according to claim 1, wherein:
the load-information transmitting unit transmits the load information to the second server in an intermittent manner; and
every time when receiving the load information from the load-information transmitting unit, the load generating unit varies the being-generated processing load in accordance with the received load information.

5. The information processing system according to claim 1, comprising a management server that receives an operation input from a manager,
the management server including:
a test-program transmitting unit that transmits a test program to the second server selected in accordance with the received operation input;
a load-information transmission requesting unit that transmits, to the first server, a request to transmit the load information to the second server that is a destination of the test program transmitted by the test-program transmitting unit; a resource amount receiving unit that receives a third resource amount indicative of the amount of resource in the second server consumed by the processing load generated by the load generating unit; and, a resource amount providing unit that provides the manager with the third resource amount received by the resource amount receiving unit.

6. The information processing system according to claim 5, wherein:
the test-program transmitting unit transmits the test program to a plurality of second servers; and
the resource amount receiving unit receives the third resource amount from each of the second servers that has received the test program.

7. The information processing system according to claim 5, wherein:
the resource amount receiving unit receives the third resource amount from the second server in an intermittent manner; and
every time when receiving the third resource amount, the resource amount providing unit provides the manager with the received third resource amount.

8. The information processing system according to claim 5, wherein the management server includes a test-program running request unit that requests the second server to run the test program.

9. An information processing method including:
running a virtual machine in a first server;
transmitting, to a second server through a network, load information indicative of a processing load generated in the first server as a result of running the virtual machine when the virtual machine is run; and,
generating a processing load corresponding to the load information received from the first server, wherein:
said transmitting the load-information includes transmitting, by the first server, an index value as the load information, said index value to be inputted into a test program to generate the processing load in accordance with the input of said index value and to vary the processing load in accordance with a magnitude of the index value; and
said generating the processing load includes reading out the test program, inputting the transmitted index value into the read-out test program, and generating the processing load.

10. The information processing method according to claim 9, further including
storing a first resource amount indicative of the amount of resource in the first server consumed by the processing load generated by the test program and a first index value in a manner that the first resource amount and the first index value are associated with each other in the case where the first index value is inputted into the test program in the first server,
wherein said transmitting the load-information includes:
obtaining a second resource amount indicative of the amount of resource in the first server consumed as a result of running the virtual machine;
calculating a second index value corresponding to the obtained second resource amount on the basis of the stored first resource amount and the stored first index value stored; and,
transmitting the calculated second index value to the second server as the load information.

11. The information processing method according to claim 10, wherein said transmitting the load-information includes calculating the second index value by multiplying the obtained second resource amount by a ratio of the first index value to the first resource amount.

12. The information processing method according to claim 9, wherein:
said transmitting the load-information is intermittently repeated;
said generating the processing load includes newly estimating a processing load in accordance with the received load information and varying the being-generated processing load every time when the transmitted load information is received.

13. The information processing method according to claim 9, further including:
transmitting, by a management server receiving an operation input from a manager, a test program to the second server selected in accordance with the received operation input;
transmitting, to the first server, a request to transmit the load information to the second server that is a destination of the test program;
receiving a third resource amount indicative of the amount of resource in the second server consumed by the generated processing load generated in the load generating step; and,
providing the manager with the third resource amount.

14. The information processing method according to claim 13, wherein:
said transmitting the test-program includes transmitting the test program to a plurality of second servers; and
said receiving the third resource amount includes receiving the third resource amount from each of the second servers that has received the test program.

15. The information processing method according to claim 13, wherein:
said receiving the third resource amount is intermittently repeated; and
said providing the manager with the third resource amount includes providing the manager with the received third resource amount every time when the third resource amount is received.

16. The information processing method according to claim 13, further including requesting the second server to run the test program.

17. A non-transitory computer-readable storage medium that stores programs executed by a first server and a second server that can communicate with each other through a network, the program causing the first server or the second server to perform:
a running process of causing the first server to run a virtual machine;
a load-information transmitting process of transmitting, to the second server, load information indicative of a processing load generated in the first server as a result of running the virtual machine when the virtual machine is run in the running process; and,
a load generating process of generating a processing load in the second server corresponding to the load information received from the first server, wherein:
the load-information transmitting process transmits an index value as the load information, said index value to be inputted into a test program to generate the processing load in accordance with the input of said index value and to vary the processing load in accordance with a magnitude of the index value; and the load generating process reads out the test program, inputs the transmitted index value into the read-out test program, and generates the processing load.

* * * * *

UNITED STATES PATENT AND TRADEMARK OFFICE
CERTIFICATE OF CORRECTION

PATENT NO.       : 8,819,174 B2
APPLICATION NO.  : 13/384080
DATED            : August 26, 2014
INVENTOR(S)      : Mitsuru Yanagisawa It is certified that error appears in the above-identified patent and that said Letters Patent is hereby corrected as shown below:

In the Specification

Column 8, Line 31: delete "I," and insert -- $I_1$, --

Column 13, Line 66: delete "$I_2=I_A$/where" and insert -- $I_2=I_A$, where --

Signed and Sealed this
Third Day of February, 2015

Michelle K. Lee
*Deputy Director of the United States Patent and Trademark Office*